Dec. 25, 1962     J. P. LA KARNAFEAUX ET AL     3,070,189
CONTROL DEVICE FOR A VEHICLE LIFT

Filed Sept. 9, 1960     2 Sheets-Sheet 1

INVENTORS
JOHN P. LAKARNAFEAUX
BY ROY A. MC CRARY
John R. Walker, III
Attorney

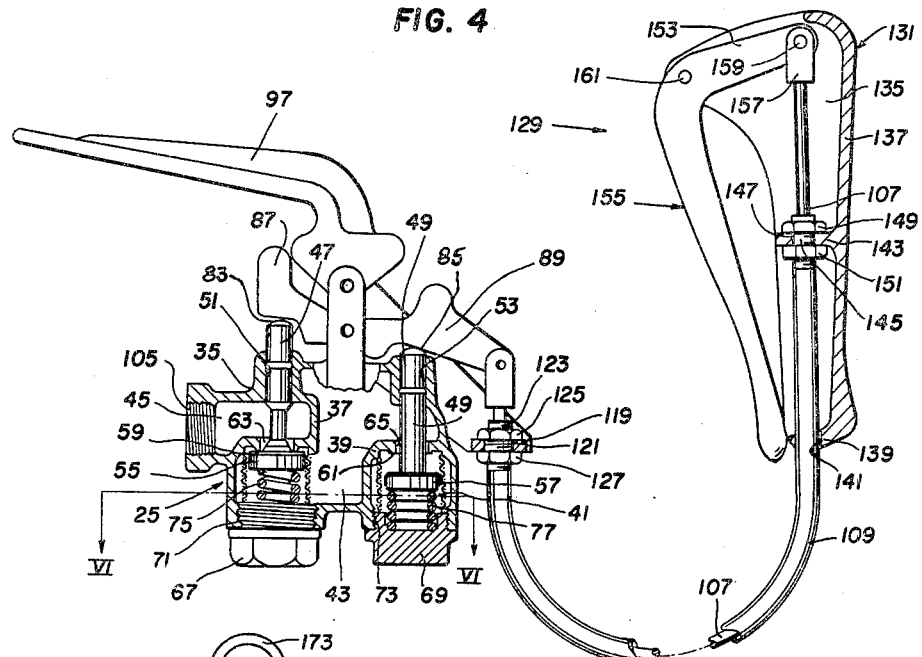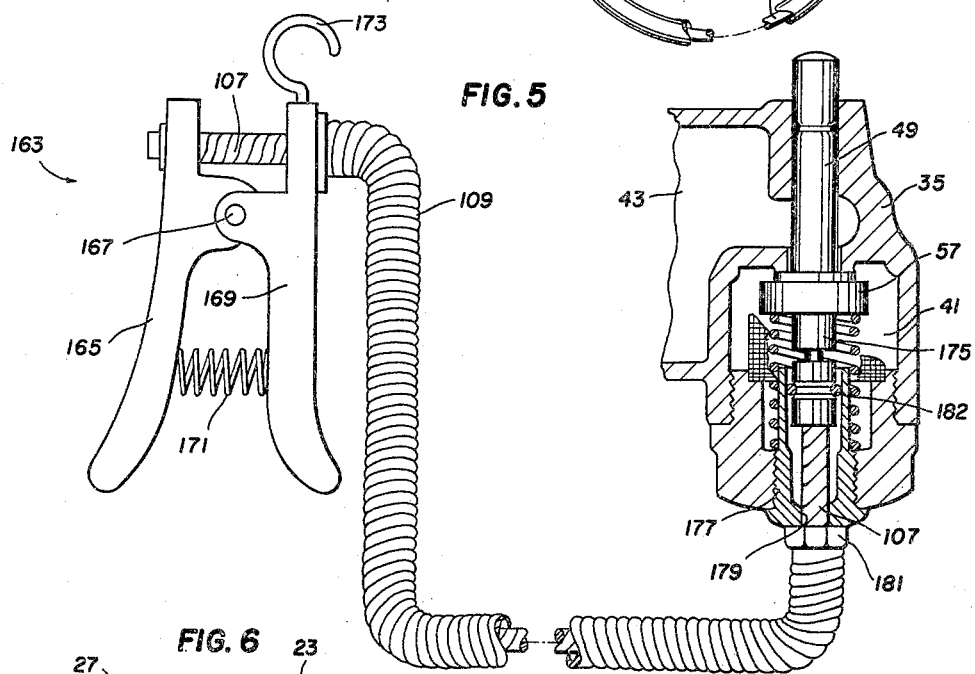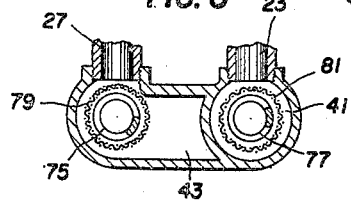

United States Patent Office 3,070,189
Patented Dec. 25, 1962

3,070,189
CONTROL DEVICE FOR A VEHICLE LIFT
John P. La Karnafeaux, Springfield, and Roy A. McCrary, Newton Square, Pa., assignors to Dover Corporation, Washington, D.C.
Filed Sept. 9, 1960, Ser. No. 54,954
10 Claims. (Cl. 187—8.41)

This invention relates to a device for controlling the raising and/or lowering of a vehicle lift, particularly of the type provided with a superstructure having movable vehicle engaging portions or pads.

In vehicle lifts of the above mentioned type, in preparation for lifting, it is necessary, first, to position accurately the vehicle engaging pads at the proper places beneath suitable pickup points on the vehicle. Otherwise, there is a likelihood of damage to the vehicle, as for example, if one of the pads were beneath the gas tank, it would damage the tank and the vehicle would not be held properly on the lift, which could possibly cause it to fall. Heretofore, this positioning was done by trial and error with the operator going back and forth between the pads and the control valve. For example, with the lift in a lower position, the operator positions the pads generally at the places that he estimates are under the pickup points on the vehicle. Then he walks over to the control valve which is generally located adjacent a wall and he moves the control valve handle to cause the lift to raise closer to the vehicle. Next, he goes back to the lift to position more accurately the pads and, then, back to the control valve, and so on, until he is sure the pads are accurately positioned, whereupon he proceeds to cause the vehicle to be lifted to the desired height. Thus, it will be understood that the operator wastes much time in going back and forth between the control valve and the lifting pads, and there is danger in not positioning the pads properly.

The present invention is directed towards providing a simple and convenient means which saves the operator a great deal of time in preparing the vehicle lift for raising, and which provides greater accuracy in positioning the pads thereby eliminating the chances of damage to the vehicle.

Thus, one of the objects of the present invention is to provide a control device for vehicle lifts which aids the operator greatly in properly positioning the vehicle engaging portions of a vehicle lift.

A further object is to provide such a device which comprises a remote control means movable to any place around the vehicle lift so that the vehicle may be raised by the operator as he is positioning the vehicle engaging portions of the vehicle lift.

A further object is to provide such a device which is economical to manufacture and easily adaptable to existing control valve mechanisms.

A further object is to provide such a device which is so arranged that it does not interfere with the normal operation of the existing operating handle so that, if desired, the lift may be operated at the control valve itself rather than by the remote control means of the present invention.

A further object is generally to improve the design and construction of control devices for vehicle lifts.

The means by which the foregoing and other objects of the present invention are accomplished and the manner of their accomplishment will be readily understood from the following specification upon reference to the accompanying drawings, in which:

FIG. 4 is a view similar to FIG. 2 but showing portions of the device in section for purposes of illustration and showing the device in an actuated position.

FIG. 5 is a fragmentary and partly sectionalized view of a modified form of the present invention.

FIG. 6 is a sectional view taken on the line VI—VI of FIG. 4.

Figure 1:
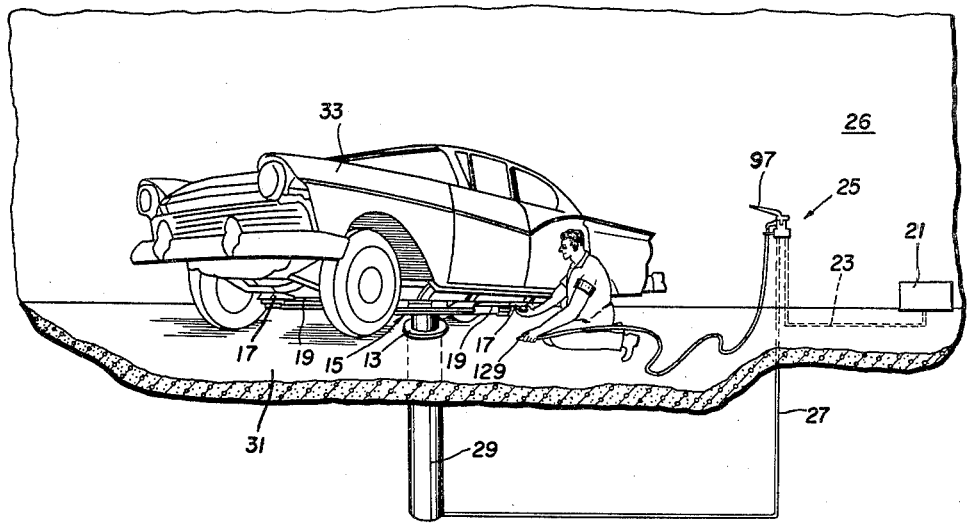
FIG. 1 is a fragmentary perspective view of a typical vehicle lift installation illustrating the use of the control device of the present invention therewith.

Referring now to the drawings in which the various parts are indicated by numerals, the control device 11 of the present invention is shown with a typical vehicle lift installation in FIG. 1, wherein it will be seen that the installation comprises a vertically disposed jack 13 having a superstructure 15 fixedly mounted on top of the jack. Superstructure 15 is of the type which includes positionable vehicle engaging portions, for example, of the well-known swinging arm type, as shown in the drawings, which includes movable pads 17 mounted on swinging arms 19. The installation shown in FIG. 1, in addition, includes the usual fluid supply means, indicated diagrammatically as at 21, which fluid in the present example is preferably air, although it may be other fluids without departing from the spirit and scope of the present invention. A pipe 23 leads from fluid supply means 21 to a control valve, indicated in general as at 25, to be described in more detail hereinafter, and which valve is usually mounted on a wall, as wall 26. Another pipe 27 leads from control valve 25 to the cylinder 29 of jack 13, which cylinder is disposed below the supporting surface 31 of the vehicle 33 to be lifted. Thus, compressed air is introduced through pipes 23, 27 and control valve 25 to the fluid in cylinder 29, which fluid is preferably, although not necessarily, hydraulic fluid acted upon by the compressed air to lift superstructure 15 in a well-known manner.

Figure 3:
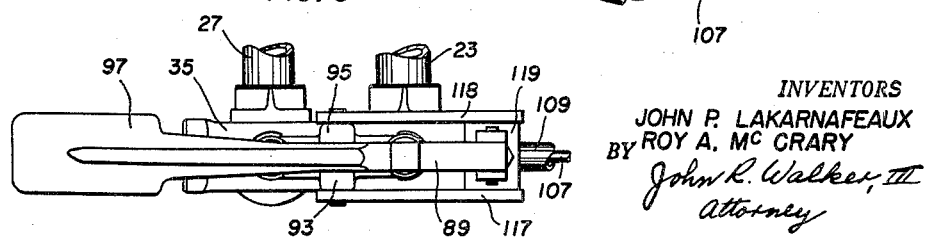
FIG. 3 is a top plan view of a fragmentary portion of the device shown in FIG. 2.

Control valve 25, with which the device 11 of the present invention is adapted to be used, is preferably of the well-known construction which includes a valve body 35 having partitions 37, 39 which divide the valve body into an inlet chamber 41, an intermediate chamber 43, and an outlet chamber 45. A pair of vertically disposed valve stems 47, 49 are respectively slidably mounted for vertical up and down movement respectively in bores 51, 53 provided in valve body 35. A pair of disc-shaped valves 55, 57 are respectively fixedly attached adjacent the lower ends of valve stems 47, 49 and adapted to seat in an upward position respectively against valve seats 59, 61 to stop the flow respectively through valve openings 63, 65, which valve openings are respectively provided in partitions 37, 39. A pair of plugs 67, 69 are threadedly engaged in threaded bores 71, 73 provided in valve body 35 respectively below valves 55, 57. A compression spring 75 is interposed between the lower end of valve 55 and plug 67 to urge the valve upwardly into a normally seated position, as best shown in FIG. 4. Likewise, a compression spring 77 is provided between valve 57 and plug 69 to urge the valve upwardly into a normally seated position. A pair of wire strainers 79, 81 are preferably respectively provided around valves 55, 57. Stems 47, 49 extend upwardly beyond valve body 35 so that the respective upper ends 83, 85 are normally in upper extended positions, as best shown in FIG. 3, in which case valves 55, 57 are seated.

A pair of rocker arms 87, 89 are pivotally mounted respectively above stems 47, 49 for pivot about a substantially horizontal axis by means of a pivot pin 91 extending through aligned apertures in the rocker arms and through aligned apertures in a pair of projections 93, 95 upstanding from valve body 35. A lever 97 is pivotally mounted from projections 93, 95 for pivot about a substantially horizontal axis by a pivot pin 99 extending through aligned apertures in the projections and in lever 97. Lever 97 is preferably angled to one side, as best seen in FIGS. 1, 2 and 4, and is provided with protrusions 101, 103 that respectively extend over rocker arms 87, 89.

Figure 2:
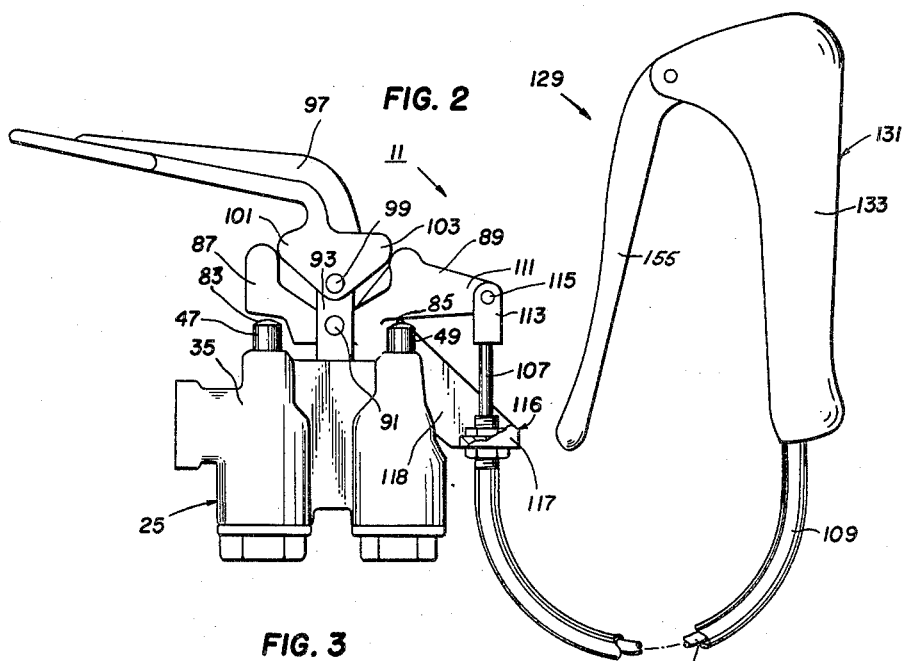
FIG. 2 is an enlarged side elevational view of a preferred form of the control device of the present invention with the device shown in a released position, and with a portion of the brace being broken away for purposes of clarity.

In the usual operation of control valve 25 to raise superstructure 15, the operator pulls upwardly on lever 97 to rotate the lever clockwise, as viewed in FIG. 2, which causes protrusion 103 to engage rocker arm 89 and pivot the rocker arm downwardly which, in turn, contacts stem 49 to push the stem downwardly against spring 77 to unseat valve 57. Since inlet chamber 41 contains high pressure air due to the fact that pipe 23 is in communication therewith, as best seen in FIG. 6, the air passes through valve opening 65 into intermediate chamber 43 and then out through pipe 27, which is in communication with chamber 43, to cylinder 29 whereupon the air pressure causes superstructure 15 to raise. To stop the raising of superstructure 15, lever 97 is moved to the neutral position, best shown in FIG. 2, whereupon the valve 57 closes under the influence of spring 77. To lower superstructure 15, lever 97 is pushed downwardly which causes protrusion 101 to engage rocker arm 87 and pivot the rocker arm downwardly which, in turn, contacts stem 47 whereupon the stem is moved downwardly against spring 75 to unseat valve 55. This permits the air to flow from cylinder 29 through pipe 27, through intermediate chamber 43, through opening 63, through outlet chamber 45, and thence outwardly through the outlet opening 105 provided in valve body 35. If desired, a suitable muffler, not shown, may be provided at outlet opening 105.

The following is a description of the control device 11 of the present invention and its relationship to the above mentioned installation:

Control device 11 comprises, in general, a flexible elongated actuating element or cable 107 slidably mounted in a flexible sleeve 109, means operably coupling cable 107 to valve 57 adjacent one end of the cable, and a handgrip device coupled to the cable adjacent the opposite end thereof for moving cable 107.

In the preferred form of control device 11, best shown in FIGS. 2–4, the cable 107 is operably coupled to valve 57 through rocker arm 89 and stem 49. Thus, the end of cable 107 is coupled to an extension 111 of rocker arm 89 by means of a U-shaped bracket 113 fixedly attached to the end of the cable by suitable means, as by threading or the like, and which bracket is pivotally connected to extension 111 by a pivot pin 115 extending through aligned apertures in the extension and the bracket. Sleeve 109 is fixedly coupled to valve body 35 by suitable means, as for example, a U-shaped brace 116 having legs 117, 118 respectively attached to projections 93, 95 and angled downwardly therefrom. Brace 116 is provided adjacent the lower end thereof with a horizontally extending portion 119 extending between legs 117, 118 and which portion has a vertical aperture 121 through which a threaded portion 123 of sleeve 109 extends with the sleeve being anchored to horizontal portion 119 by means of nuts 125, 127 threadedly engaged on portion 123 on opposite sides of portion 119.

The handgrip device 129 of the preferred form, best shown in FIGS. 2 and 4, comprises a handle 131 which includes a pair of spaced sides 133, 135 which are integrally connected along one edge thereof by an end 137. Thus, it will be understood that the edge of handle 131 opposite from end 137 is open. A transverse rib 139 is integrally formed adjacent the lower end of handle 131 and is provided with an aperture 141 through which sleeve 109 extends. The end of sleeve 109 is fixedly attached to a second transverse rib 143 integrally formed in handle 131 intermediate the ends thereof. The means by which the end of sleeve 109 is attached to rib 143 is preferably by a threaded portion 145 on the end of the sleeve which extends through an aperture 147 in rib 143 and is anchored therein by means of nuts 149, 151, threadedly engaging threaded portion 145 on opposite sides of rib 143. Cable 107 extends beyond the end of sleeve 109 in handle 131 and is pivotally attached to the lever 153 of a handle 155 by suitable means, as a coupler 157 similar to coupler 113, to which cable 107 is fixedly attached, as by threading or the like, and which coupler is pivotally connected to lever 153 by means of a pivot pin 159 extending through aligned apertures in the coupler and the lever. Handle 155 is pivotally mounted relative to handle 131 by means of a pivot pin 161 extending through aligned apertures in handle 155 and sides 133, 135.

From the foregoing it will be understood that with handles 131, 155 in the normally extended position, as shown in FIG. 2, the handgrip device 129 is adapted to be grasped by the operator and squeezed until the lower ends of the handles are in abutment, as shown in FIG. 4, whereupon the cable 107 is moved lengthwise in sleeve 109 in a direction to pull rocker arm 89 downwardly to actuate valve 57 which, in turn, causes the superstructure 15 to be raised. Also, it will be understood that upon release of handgrip device 129, the parts will move back under the influence of spring 77 to their original at-rest positions to stop the movement of the superstructure 15.

Cable 107 and sleeve 109 are long enough so that handgrip device 129 will reach all positions beneath and around superstructure 15 whereby the operator can kneel down, as shown in FIG. 1, and while positioning the pads 17 with one hand, he can grasp the handgrip device 129 with the other and cause raising of the superstructure without having to get up and go back to the control valve 25. Thus, it will be understood that this saves considerable time and gives complete accuracy of positioning so that there is no danger of damage to the vehicle. In addition, it will be understood that control valve 25 is still free to be operated in the usual manner by means of lever 97.

Although the control device 11 has been illustrated in conjunction with the raising of the superstructure 15, the control device may be applied to the lowering of the superstructure without departing from the spirit and scope of the present invention.

The handgrip device 163 of the form shown in FIG. 5 has been modified somewhat over handgrip 129 of the preferred form, although it operates on the same principle. Thus, handgrip 163 includes a handle 165 fixedly attached to cable 107 by suitable means and pivotally connected by suitable means, as at 167, to the other handle 169 which, in turn, is attached to sleeve 109 by suitable means. A spring 171 is provided between handles 165 and 169 to aid in the return of cable 107 to its normal position upon release of handgrip 163, which spring 171 may be provided on the preferred embodiment, if desired. In addition, a hook 173 may be attached to handgrip 163 or the handgrip 129, if desired, for hanging the handgrip from the wall when not in use.

Also, FIG. 5 shows a modified means for operably coupling cable 107 to valve 57. In this modified construction, instead of operably coupling the cable 107 to the rocker arm 89, the cable is introduced from the underside of control valve 25 and attached to the lower end of valve 57 by suitable means, as for example, providing a reduced extension 175 depending from valve 57 and coupling the cable 107 thereto, as by threading or the like. In this construction it is only necessary to replace plug 69 by a hollow plug 177 that has an aperture 179 in the lower end thereof and through which slidably extends cable 107. Also, in this modification the sleeve 169 is fixedly attached to plug 177 by suitable means, as for example, nut 181. In addition, an O-ring 182 is preferably provided between extension 175 and plug 177. It will be understood that, in this modified construction, by squeezing handgrip 163 valve 57 is drawn downwardly and the lift raised in the same manner as heretofore described for the preferred embodiment, and when the handgrip is released, the parts will return to their normal positions, as shown in FIG. 5, to stop the raising of the superstructure 15.

From the foregoing it will be understood that a very convenient, safe, handy and efficient device is provided for controlling the operation of a vehicle lift. Further, such a device is provided which is economical to manufacture and which is easy to install on existing control valves for vehicle lifts.

Although the invention has been described in some detail by way of illustration and example for purposes of clarity or understanding, it is to be understood that it is not to be so limited since changes and modifications may be made therein which are within the full intended scope of this invention as hereinafter claimed.

We claim:

1. The combination with a vehicle lift of the type including a jack provided with a superstructure on the top thereof having a plurality of positionable vehicle engaging portions, and valve means for controlling the flow of fluid to raise and lower said jack; of a control device comprising a flexible elongated actuating element having a first end and an opposite second end, means operably connecting said first end to said valve means for operating said jack upon lengthwise movement in at least one direction of said actuating element, actuating means connected to said actuating element adjacent said second end to move said element in said direction and thereby operate said jack, said actuating element being of a sufficient length so that said actuating means will reach beneath and around said supporting structure whereby said lift is adapted to be operated by an operator when he is in locations where he can manually position said vehicle engaging portions.

2. The combination with a vehicle lift of the type including a jack provided with a superstructure on the top thereof having a plurality of positionable vehicle engaging portions, and valve means for controlling the flow of fluid to operate said jack; of a control device comprising a flexible elongated sleeve, a flexible elongated cable slidably mounted in said sleeve, a handgrip device including a first handle and a second handle pivotally mounted from said first handle, means fixedly coupling said sleeve to said second handle adjacent one end of said sleeve, means operably coupling said cable to said valve means adjacent one end of said cable for operating said valve means to operate said jack and means fixedly coupling said cable to said first handle adjacent the opposite end of said cable, said handgrip being adapted to be squeezed from an expanded position in which the ends of said handles are spaced to a squeezed position in which the ends of said handles are in adjacency, movement of said handgrip from said expanded to said squeezed position being effective to pull said cable lengthwise in said sleeve to operate said valve means and, thereby, said jack, said cable and said sleeve being of a sufficient length so that said handgrip will reach beneath and around said supporting structure whereby said lift is adapted to be operated by an operator when he is in locations where he can manually position said vehicle engaging portions.

3. The combination with a vehicle lift of the type including a jack provided with a superstructure on the top thereof having a plurality of positionable vehicle engaging portions and valve means for controlling the flow of fluid to operate said jack; of a control device comprising a flexible elongated sleeve, a flexible elongated cable slidably mounted in said sleeve, a handgrip device including a first handle and a second handle pivotally mounted from said first handle, said handgrip being movable to positions near said superstructure, means fixedly coupling said sleeve to said second handle adjacent one end of said sleeve, means operably coupling said cable to said valve means adjacent one end of said cable for operating said valve means to operate said jack and means fixedly coupling said cable to said first handle adjacent the opposite end of said cable, said handgrip being adapted to be squeezed from an expanded position in which the ends of said handles are spaced to a squeezed position in which the ends of said handles are in adjacency, movement of said handgrip from said expanded to said squeezed position being effective to pull said cable lengthwise in said sleeve to operate said valve means and, thereby, said jack, said cable and said sleeve being of a sufficient length so that said handgrip device will reach beneath and around said superstructure whereby said lift is adapted to be operated by an operator when he is in locations where he can manually position said vehicle engaging portions.

4. In a vehicle lift of the type including a jack provided with a superstructure on the top thereof having positionable vehicle engaging portions, and valve means for controlling the flow of fluid to raise and lower said jack; said valve means including a valve body and at least one valve having a valve stem attached thereto and positionable for operating said jack, a pivotally mounted rocker arm above said stem, and a pivotally mounted lever above said rocker arm adapted to contact said rocker arm to move said rocker arm downwardly and, thereby, in turn, to move said stem downwardly for the operation of said jack; a control device comprising a flexible elongated sleeve, a flexible elongated cable slidably mounted in said sleeve, a handgrip device including a first handle and a second handle pivotally mounted from said first handle, means fixedly coupling said sleeve to said valve body adjacent one end of said sleeve and means fixedly coupling said sleeve to said second handle adjacent the opposite end of said sleeve, means fixedly coupling said cable to said rocker arm adjacent one end of said cable and means fixedly coupling said cable to said first handle adjacent the opposite end of said cable, said handgrip being adapted to be squeezed from an expanded position in which the ends of said handles are spaced to a squeezed position in which the ends of said handles are in adjacency, movement of said handgrip from said expanded to said squeezed position being effective to pull said cable lengthwise in said sleeve to move said rocker arm downwardly independent of said lever and, thereby, in turn, move said stem downwardly for the operation of said jack, said cable and said sleeve being of a sufficient length so that said handgrip will reach beneath and around said supporting structure whereby said lift is adapted to be operated by an operator when he is in locations where he can position said vehicle engaging portions.

5. In a vehicle lift of the type including a jack provided with a superstructure on the top thereof having positionable vehicle engaging portions, and valve means for controlling the flow of fluid to raise and lower said jack; said valve means including a valve body and at least one valve having a valve stem attached thereto and positionable for operating said jack, a pivotally mounted rocker arm above said stem, and a pivotally mounted lever above said rocker arm adapted to contact said rocker arm to move said rocker arm downwardly and, thereby, in turn, to move said stem and said valve downwardly for the operation of said jack; a control device comprising a flexible elongated sleeve, a flexible elongated cable slidably mounted in said sleeve, a handgrip device including a first handle and a second handle pivotally mounted from said first handle, means fixedly coupling said sleeve to said valve body adjacent one end of said sleeve and means fixedly coupling said sleeve to said second handle adjacent the opposite end of said sleeve, said cable extending into said valve body adjacent the lower portion of said valve body, means fixedly coupling said cable to said valve adjacent the lower end of said valve means fixedly coupling said cable to said first handle adjacent the opposite end of said cable, said handgrip being adapted to be squeezed from an expanded position in which the ends of said handles are spaced to a squeezed position in which the ends of said handles are in adjacency, movement of said handgrip from said expanded to said squeezed position being effective to pull said cable lengthwise in said sleeve to move said valve downwardly independent of said lever and, thereby, in turn, operate said jack, said cable and said sleeve being of a sufficient length so that said handgrip will reach beneath and around said supporting structure whereby said lift is adapted to be operated by an operator when he is in locations where he can position said vehicle engaging portions.

6. The structure according to claim 2 including spring means urging said handles apart whereby said handgrip is adapted to move into said expanded position when said handles are released.

7. The structure according to claim 2 including hook means attached to said handgrip for supporting said handgrip from a supporting structure when not in use.

8. In a vehicle lift of the type including a jack provided with a superstructure on the top thereof having positionable vehicle engaging portions, and valve means for controlling the flow of fluid to raise and lower said jack; said valve means including a valve body and at least one valve having a valve stem attached thereto and positionable for operating said jack, a pivotally mounted rocker arm above said stem, and a pivotally mounted lever above said rocker arm adapted to contact said rocker arm to move said rocker arm downwardly and, thereby, to move said stem downwardly for the operation of said jack; a control device comprising a flexible elongated sleeve, a flexible elongated cable slidably mounted in said sleeve, a handgrip device including a first member and a second member, means fixedly coupling said sleeve to said valve body adjacent one end of said sleeve and means fixedly coupling said sleeve to said second member adjacent the opposite end of said sleeve, means fixedly coupling said cable to said rocker arm adjacent one end of said cable and means fixedly coupling said cable to said first member adjacent the opposite end of said cable, said handgrip being adapted to be squeezed from an expanded position in which said first and second members are spaced to a squeezed position in which said first and second members are in adjacency, movement of said handgrip from said expanded to said squeezed position being effective to pull said cable lengthwise in said sleeve to move said rocker arm downwardly independent of said lever and, thereby, in turn, move said stem downwardly for the operation of said jack, said cable and said sleeve being of a sufficient length so that said handgrip will reach beneath and around said superstructure whereby said lift is adapted to be operated by an operator when he is in locations where he can position said vehicle engaging portions.

9. In a vehicle lift of the type including a jack provided with a superstructure on the top thereof having positionable vehicle engaging portions, and valve means for controlling the flow of fluid to raise and lower said jack; said valve means including a valve body and at least one valve having a valve stem attached thereto and positionable for operating said jack, a pivotally mounted rocker arm above said stem, and a pivotally mounted lever above said rocker arm adapted to contact said rocker arm to move said rocker arm downwardly and, thereby, in turn, to move said stem and said valve downwardly for the operation of said jack; a control device comprising a flexible elongated sleeve, a flexible elongated cable slidably mounted in said sleeve, a handgrip device including a first member and a second member, means fixedly coupling said sleeve to said valve body adjacent one end of said sleeve and means fixedly coupling said sleeve to said second member adjacent the opposite end of said sleeve, said cable extending into said valve body adjacent the lower portion of said valve body, means fixedly coupling said cable to said valve adjacent the lower end of said valve and means fixedly coupling said cable to said first member adjacent the opposite end of said cable, said handgrip being adapted to be squeezed from an expanded position in which said first and second members are spaced to a squeezed position in which said first and second members are in adjacency, movement of said handgrip from said expanded to said squeezed position being effective to pull said cable lengthwise in said sleeve to move said valve downwardly independent of said lever and, thereby, in turn, operate said jack, said cable and said sleeve being of a sufficient length so that said handgrip will reach beneath and around said superstructure whereby said lift is adapted to be operated by an operator when he is in locations where he can position said vehicle engaging portions.

10. The combination with a vehicle lift of the type including a jack provided with a superstructure on the top thereof having a plurality of manually positionable vehicle engaging portions, and valve means for controlling the flow of fluid to operate said jack; of a control device comprising a handgrip device including first and second members movable relative to one another, flexible and elongated means coupled between said handgrip device and said valve means and responsive to movement of said first and second members relative to one another to operate said valve means and, thereby, said jack, said flexible and elongated means being movable to locations near enough to said superstructure so that an operator can manually position said vehicle engaging portions and yet can operate said valve means by said handgrip device from said locations.

References Cited in the file of this patent

UNITED STATES PATENTS

| | | |
|---|---|---|
| 1,959,786 | Hodgkinson | May 22, 1934 |
| 2,026,398 | Eiserer | Jan. 7, 1936 |
| 2,185,067 | Sholes | Dec. 26, 1939 |
| 2,465,183 | Allen | Mar. 22, 1949 |
| 2,466,363 | Bodinaux et al. | Apr. 5, 1949 |
| 2,612,355 | Thompson | Sept. 30, 1952 |
| 2,702,678 | Flock | Feb. 22, 1955 |
| 2,957,650 | Horan et al. | Oct. 25, 1960 |
| 2,966,222 | Lambert | Dec. 27, 1960 |